United States Patent
Padmanaban

(10) Patent No.: US 12,332,069 B2
(45) Date of Patent: Jun. 17, 2025

(54) INTELLIGENT VEHICLE NAVIGATOR

(71) Applicant: Tahoe Research, Ltd., Dublin (IE)

(72) Inventor: Jayashree R. Padmanaban, Bangalore (IN)

(73) Assignee: Tahoe Research, Ltd., Dublin (IE)

(*) Notice: Subject to any disclaimer, the term of this patent is extended or adjusted under 35 U.S.C. 154(b) by 0 days.

(21) Appl. No.: 18/319,364

(22) Filed: May 17, 2023

(65) Prior Publication Data
US 2023/0288217 A1 Sep. 14, 2023

Related U.S. Application Data

(63) Continuation of application No. 17/482,086, filed on Sep. 22, 2021, now Pat. No. 11,680,812, which is a continuation of application No. 16/664,394, filed on Oct. 25, 2019, now Pat. No. 11,162,807, which is a continuation of application No. 15/499,802, filed on Apr. 27, 2017, now Pat. No. 10,488,213.

(51) Int. Cl.
*G01C 21/34* (2006.01)

(52) U.S. Cl.
CPC ..... *G01C 21/3484* (2013.01); *G01C 21/3461* (2013.01); *G01C 21/3469* (2013.01)

(58) Field of Classification Search
None
See application file for complete search history.

(56) References Cited

U.S. PATENT DOCUMENTS

| | | | |
|---|---|---|---|
| 8,682,574 B2 | 3/2014 | Golding et al. | |
| 8,738,285 B2 * | 5/2014 | Scofield | G01C 21/3492 701/425 |
| 9,297,663 B1 | 3/2016 | Golding et al. | |
| 9,347,780 B2 | 5/2016 | Caine et al. | |
| 9,366,542 B2 | 6/2016 | Singh | |
| 9,367,239 B2 | 6/2016 | Pinkus et al. | |
| 10,024,675 B2 | 7/2018 | Schlesinger et al. | |

(Continued)

FOREIGN PATENT DOCUMENTS

| | | |
|---|---|---|
| CN | 101322011 A | 12/2008 |
| CN | 104165634 A | 11/2014 |
| CN | 104848869 A | 8/2015 |
| CN | 108801278 A | 11/2018 |
| DE | 10 2018 204 926 A1 | 10/2018 |
| JP | 2009-174855 A | 8/2009 |

OTHER PUBLICATIONS

"U.S. Appl. No. 15/499,802, Examiner Interview Summary mailed May 30, 2019", 3 pgs.

(Continued)

*Primary Examiner* — Todd Melton
(74) *Attorney, Agent, or Firm* — Studebaker Brackett PLLC

(57) ABSTRACT

Methods, systems, and storage media relating to a vehicle navigator system are disclosed herein. In an embodiment, vehicle operation data relating to one or more characteristics of operation of a motor vehicle may be received. An operation style by which an operator may operate the motor vehicle may be determined from the vehicle operation data. A vehicle location and a destination location may be received. A route may be determined from the vehicle location to the destination location according to the operation style by which an operator operates the motor vehicle. Other embodiments may be disclosed and/or claimed.

20 Claims, 4 Drawing Sheets

(56) References Cited

U.S. PATENT DOCUMENTS

| | | |
|---|---|---|
| 10,488,213 B2 | 11/2019 | R. Padmanaban |
| 10,712,163 B2* | 7/2020 | Liebinger Portela ........................ G01C 21/3626 |
| 2011/0153127 A1 | 6/2011 | Weslati et al. |
| 2013/0066547 A1* | 3/2013 | Schramm ........... G01C 21/3484 701/538 |
| 2015/0012167 A1 | 1/2015 | Wolter |
| 2015/0345981 A1 | 12/2015 | Goldman-Shenhar et al. |
| 2016/0195406 A1 | 7/2016 | Miles et al. |
| 2018/0238701 A1 | 8/2018 | Liebinger et al. |
| 2018/0313656 A1 | 11/2018 | R. Padmanaban |
| 2020/0166358 A1 | 5/2020 | R. Padmanaban |

OTHER PUBLICATIONS

"U.S. Appl. No. 15/499,802, Final Office Action mailed Apr. 24, 2019", 17 pgs.

"U.S. Appl. No. 15/499,802, Non Final Office Action mailed Nov. 19, 2018", 14 pgs.

"U.S. Appl. No. 15/499,802, Notice of Allowance mailed Jul. 19, 2019", 8 pgs.

"U.S. Appl. No. 15/499,802, Response filed Feb. 11, 2019 to Non Final Office Action mailed Nov. 19, 2018", 10 pgs.

"U.S. Appl. No. 15/499,802, Response filed Jun. 24, 2019 to Final Office Action mailed Apr. 24, 2019", 8 pgs.

"U.S. Appl. No. 15/499,802, Supplemental Notice of Allowability mailed Oct. 16, 2019", 4 pgs.

"U.S. Appl. No. 16/664,394, Notice of Allowance mailed Jun. 29, 2021", 9 pgs.

"U.S. Appl. No. 16/664,394, Preliminary Amendment filed Mar. 19, 2020", 7 pgs.

"Chinese Application Serial No. 201810258060.1, Voluntary Amendment filed Apr. 27, 2020", w/English Claims, 17 pgs.

"German Application Serial No. 102018204926.2, Voluntary Amendment filed Apr. 14, 2020", w/English Claims, 8 pgs.

"Navigon AG", Personalised Navigation With a Learning Effect, [Online] Retrieved from the internet: http://www.pmewswire.e.co.uk/news-releases/navigon-myroutes-personalisediavigation-with-a-learning-effect-153789045.html>, (Mar. 2, 2009), 4 pgs.

\* cited by examiner

INTELLIGENT VEHICLE NAVIGATOR

CROSS-REFERENCE TO RELATED APPLICATIONS

This application is a Continuation of U.S. patent application Ser. No. 17/482,086, filed Sep. 22, 2021, which a Continuation of U.S. patent application Ser. No. 16/664,394, filed Oct. 25, 2019, which is a Continuation of U.S. patent application Ser. No. 15/499,802, filed Apr. 27, 2017, the entire contents of which are incorporated herein by reference.

FIELD

The present disclosure relates to the field of on-board vehicle navigator systems, and in particular, to apparatuses, methods and storage media associated with such systems.

BACKGROUND

Some on-board vehicle navigator systems may receive vehicle location information from a location system, which may communicate with a satellite positioning system such as the Global Positioning System (GPS) or an analogous system, to indicate a location of the vehicle to an operator or another occupant of the vehicle. Such navigator systems may receive or obtain a destination location and may cooperate with a map or mapping system to provide for the operator and/or an occupant a route from the vehicle location to the destination location. In some implementations, the route may be provided based a default and/or an operator-selected criterion such as "fastest route."

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
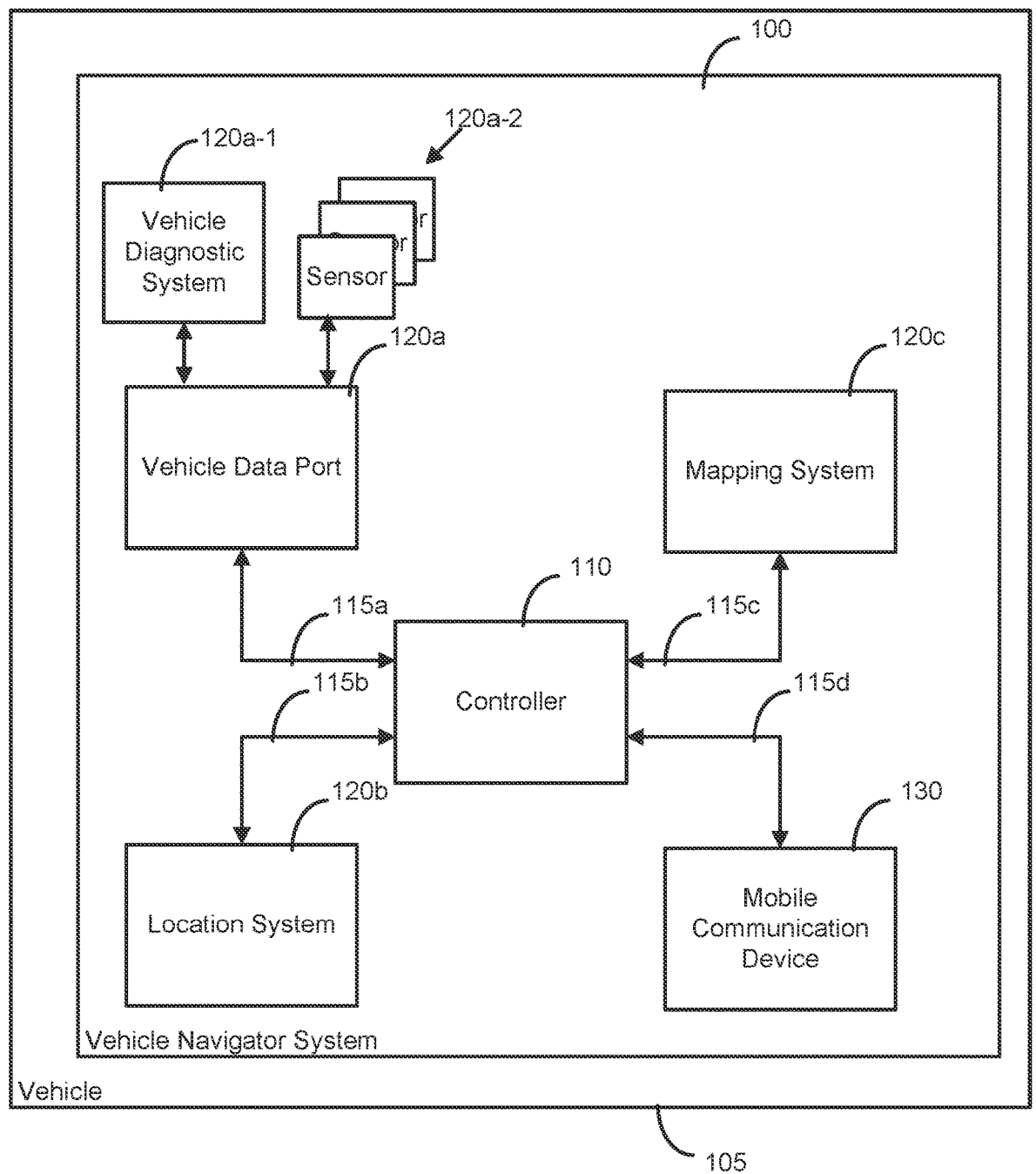
FIG. 1 is a block diagram of a vehicle navigator system, according to some embodiments.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed to imply that the various operations are necessarily order-dependent. In particular, these operations might not be performed in the order of presentation. Operations described may be performed in a different order than the described embodiments. Various additional operations might be performed, or described operations might be omitted in additional embodiments.

The description may use the phrases "in an embodiment", "in an implementation", or in "embodiments" or "implementations", which may each refer to one or more of the same or different embodiments. Furthermore, the terms "comprising." "including," "having," and the like, as used with respect to embodiments of the present disclosure, are synonymous.

As used herein, the term "logic" and "module" may refer to, be part of, or include any or any combination of an Application Specific Integrated Circuit (ASIC), an electronic circuit, a programmable combinatorial circuit (such as field programmable gate arrays (FPGA))m a processor (shared, dedicated, or group) or memory (shared, dedicated, or group) that execute one or more software or firmware programs, or other suitable components that provide the described functionality.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "network element", may be considered synonymous to or referred to as a networked computer, networking hardware, network equipment, router, switch, hub, bridge, gateway, or other like device. The term "network element" may describe a physical computing device of a network with wired or wireless communication links. Furthermore, the term "network element" may describe equipment that provides radio baseband functions for data or voice connectivity between a network and one or more users.

FIG. 1 is a block diagram of a vehicle navigator system 100, according to some embodiments. Vehicle navigator system 100 may be disposed in or on-board a vehicle 105. In some embodiments, vehicle 105 may include a motor vehicle such as an automobile or a truck, for example.

Vehicle navigator system 100 may include a controller 110 and one or more connections 115a-115c, for example, which may be disposed in vehicle 105 between controller 110 and one or more data sources 120a-120c, respectively. In embodiments, data sources 120a-120c may include a vehicle data port 120a that may be connected to and communicate with controller 110 via connection 115a. A vehicle diagnostic system 120a-1 may communicate with controller 110 via vehicle data port 120a regarding one or more on-board vehicle diagnostic or operating characteristics such as speed, engine RPM, emission characteristics, etc. In embodiments, one or more vehicle sensors 120a-2 may determine, sense, and/or provide to controller 110 data regarding one or more other vehicle characteristics, which data may not be provided by vehicle diagnostic system 120a-1. In some embodiments, the one or more other vehicle characteristics may include any or all of seat belt connection status, horn operation, extent and/or frequency of shock absorber operation, ignition status, hard braking, etc. In embodiments, data from vehicle diagnostic system 120a-1 and/or vehicle sensors 120a-2 may be referred to as vehicle operation data.

Vehicle navigator system 100 may include connection 115b between controller 110 and a location system 120b, which may be located on and/or associated with vehicle 105 to provide to controller 110 vehicle location information that may indicate a location of vehicle 105. In embodiments, location system 120b may communicate and operate in association with a positioning system, such as a satellite positioning system like GPS, or an analogous positioning system. Vehicle navigator system 100 may also include a connection 115c between controller 110 and a map or mapping system 120c. In some embodiments, map or mapping system 120c may be included in or integral with vehicle navigator system 100 and located on-board vehicle 105 and/or may be accessed over a wireless network from a mapping service provider.

Vehicle navigator system 100 may also include a connection 115d between controller 110 and a mobile communication device 130, which may provide wireless communication between vehicle navigator system 100 and one or more remote network-connected systems and/or services. In some embodiments, for example, mobile communication device 130 may be integral with vehicle navigator system 100 and/or may include a separate mobile telephone local to and in communication with vehicle navigator system 100. For example, communication between vehicle navigator system 100 and a remote mapping system 120c may be carried via connection 115d and mobile communication device 130. In some embodiments, such as when it is a separate mobile telephone in communication with vehicle navigator system 100, mobile communication device 130 may provide and/or operate as a user interface for vehicle navigator system 100. In other embodiments, vehicle navigator system 100 may include a dedicated user interface.

Controller 110 may determine from the vehicle operation data at least one of a plurality of operation styles by which an operator may operate the vehicle. In embodiments, the plurality of operation styles may correspond to or correlate with one or more of a fuel-efficient operation style, a safe operation style, and/or a fastest route operation style, for example. In embodiments, other operation styles may be included, such as a scenic route operation style, for example. As an example, Table 1 lists vehicle operation data that may be associated and/or correlated with fuel-efficient and safest operation styles, for example.

TABLE 1

| Operation Style | Route Type | Sensor data | Vehicle Diagnostic Data | Road Attributes from map data |
|---|---|---|---|---|
| Safest | Safest | Seat belt Honk Shock absorber | Speed | Express way (Freeway) Carriage way (undivided highway) Divided way (divided highway) Speed limits |
| Fuel Efficient | Fuel Efficient | Ignition Shock absorber | Speed RPM Emission | Traffic density and variation Surface texture Smoothness Pavement stiffness |

In some embodiments, vehicle operation data may be correlated with routes used by a vehicle operator to determine one or more operation styles used by the vehicle operator. In other embodiments, determination of one or more vehicle operation styles may be further correlated with vehicle operation times, which may include days of the week and/or times of day. In some embodiments, the operation style may be further correlated with time of day, day of week, and/or a frequency or regularity at which the operator goes to the destination and may further include in the operation style a transportation style such commuting, errands, recreation, etc.

Vehicle navigator system 100 may receive vehicle location information from location system 120b, and the location information may be correlated with a map from mapping system 120c to indicate a location of the vehicle 105. Further, vehicle navigator system 100 may receive a destination location to which the operator may plan or intend to operate vehicle 105. In embodiments, the destination location may be selected or entered by the operator, or another person, or may be received by or retrieved from vehicle navigator system 100, by operation of one or more of location system 120b, mapping system 120c, mobile communication device 130, and/or a user interface that may be included or associated with vehicle navigator system 100. Mapping system 120c may further provide road attribute information which may include any or all of plural road types, such as Express way (Freeway), Divided way (divided highway), Carriage way (undivided highway), and speed limits In embodiments, controller 110 may provide a route from the vehicle location to the destination location according to a route type that may correspond to or be associated with at least one of the plurality of operation styles by which the operator may operate the vehicle. For example, Table 1 lists route types that may correspond to operation styles. In some embodiments, controller 110 may provide the route type based on determination of at least one of the plurality of operation styles by which the operator may operate the vehicle and without an explicit input by the operator to the navigator system 100 of an operation style or a route type.

In an embodiment, vehicle operation data that may correspond with a safest operation style and may suggest an operator preference for a safest route may include, for example, any or all of proper and/or regular use of seat belts, infrequent or no honking, no or infrequent sudden braking, and/or staying within speed limits according to vehicle diagnostic and mapping system information. As an example, a safest route type that may correspond to a safest operation style of an operator may include road attributes that may include any or all of: express ways, motor ways, divided roads, appropriate speed limits and breaks, which information may be available from mapping system 120c, for example. Some embodiments may include other safety related information as well.

In an embodiment, vehicle operation data that may correspond with a fuel efficient operation style and may suggest an operator preference for a fuel efficient route may include, for example, any or all of constant speed and RPM levels, low or moderate emission levels, and/or shock absorbers in good state. As an example, a fuel efficient route type that may correspond to a fuel efficient operation style of an operator may include road attributes such as constant or steady traffic density and variation and road smoothness, which data may be available from mapping system 120c, for example.

Before further describing vehicle navigator system 100, it should be noted that while for ease of understanding, vehicle navigator system 100 was illustrated having data sources 120a-120c, and connections 115a-115d, in alternate embodiments, there might be more or less data sources, e.g., location system 120b and mapping system 120c may be combined, or mapping system 120c may be splitted into multiple systems, such as route system, point-of-interest system, and so forth; and there might be more or less connections 115a-115d, e.g., some connections may be combined and shared, or other connections such as a parallel connection to 115a may be added. The elements and their connections are merely illustrated, and not to be read as limiting.

Figure 2:
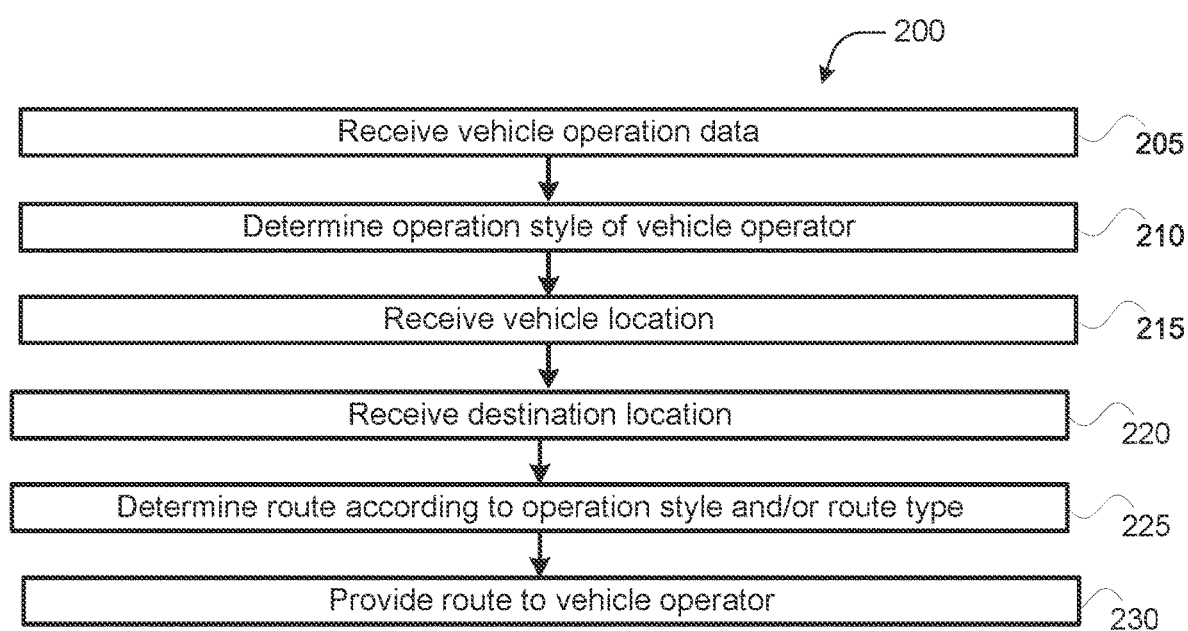
FIG. 2 is a flow flowchart illustrating an example process of providing a route to a destination according to a route type that may correspond to an operator's vehicle operation style.

FIG. 2 is a flow flowchart illustrating an example process 200 of providing a route to a destination according to a route type that may correspond to an operator's vehicle operation style. For illustrative purposes, the operations of process 200 will be described as being performed by vehicle navigator system 100 (FIG. 1). However, it should be noted that other computing devices may operate the process 200, which other devices may include networked or other computing devices that may be remote from vehicle 105 and may be in communication with a mobile communication device on-board the vehicle 105. While particular examples and orders of operations are illustrated in FIG. 2, in various embodiments, these operations may be re-ordered, separated into additional operations, combined, or omitted altogether.

At operation 205, vehicle operation data relating to one or more characteristics of operation of a motor vehicle may be received. In some embodiments, the vehicle operation data may be provided by a vehicle diagnostic system 120a-1 and/or one or more vehicle sensors 120a-2.

At operation 210, an operation style by which an operator may operate the motor vehicle may be determined from the vehicle operation data. In embodiments, the operation style may be determined as at least one of a plurality of operation styles. For example, in some embodiments, the operation style may be determined by a computing device that may be remote from vehicle 105.

At operation 215, a vehicle location may be received.

At operation 220, a destination location may be received.

At operation 225, a route may be determined from the vehicle location to the destination location according to the operation style by which an operator operates the motor vehicle. In embodiments, the route may be determined from mapping data as one of a plurality of route types that may correspond to the operation style of the operator. In embodiments, a number of candidate routes may first be identified between the vehicle location and the destination location. Then, a route type (such as safe route, fastest route, and so forth) may be determined for the various candidate routes, based at least in part on route data (e.g., from mapping system 120c). Next, the suitable route may be selected based on the compatibility of the route types of the candidate routes with the operation style of the driver of vehicle 105.

At operation 230, the route determined according to the operation style by which an operator operates the motor vehicle may be provided to the vehicle operator. In embodiments, providing the route to the vehicle operator may include displaying or announcing the route and/or directions for the route on a user interface device. In some embodiments, the user interface device may include a mobile wireless device such as a mobile telephone.

In embodiments, multiple drivers may be supported. In other words, operation styles may be determined for different drivers of the vehicle, e.g., a primary driver, and a secondary driver, and the selection of route may be based further on the operation style of the current driver. In embodiments, the identity of the driver may be provided to vehicle navigation system 100 by the driver. In other embodiments, vehicle navigator system 100 may be provided with additional components and/or logic to recognize the driver, e.g., through bio-metrics, such as fingerprints, iris, facial recognition, and so forth. In other embodiments, vehicle navigator system 100 may recognized the driver by the current operating style.

In embodiments, a driver may be computer assisted or a driver may be an autonomous driving system. Thus, a driver may be referred to as an operator, which may be human, machine, or combination thereof.

Figure 3:
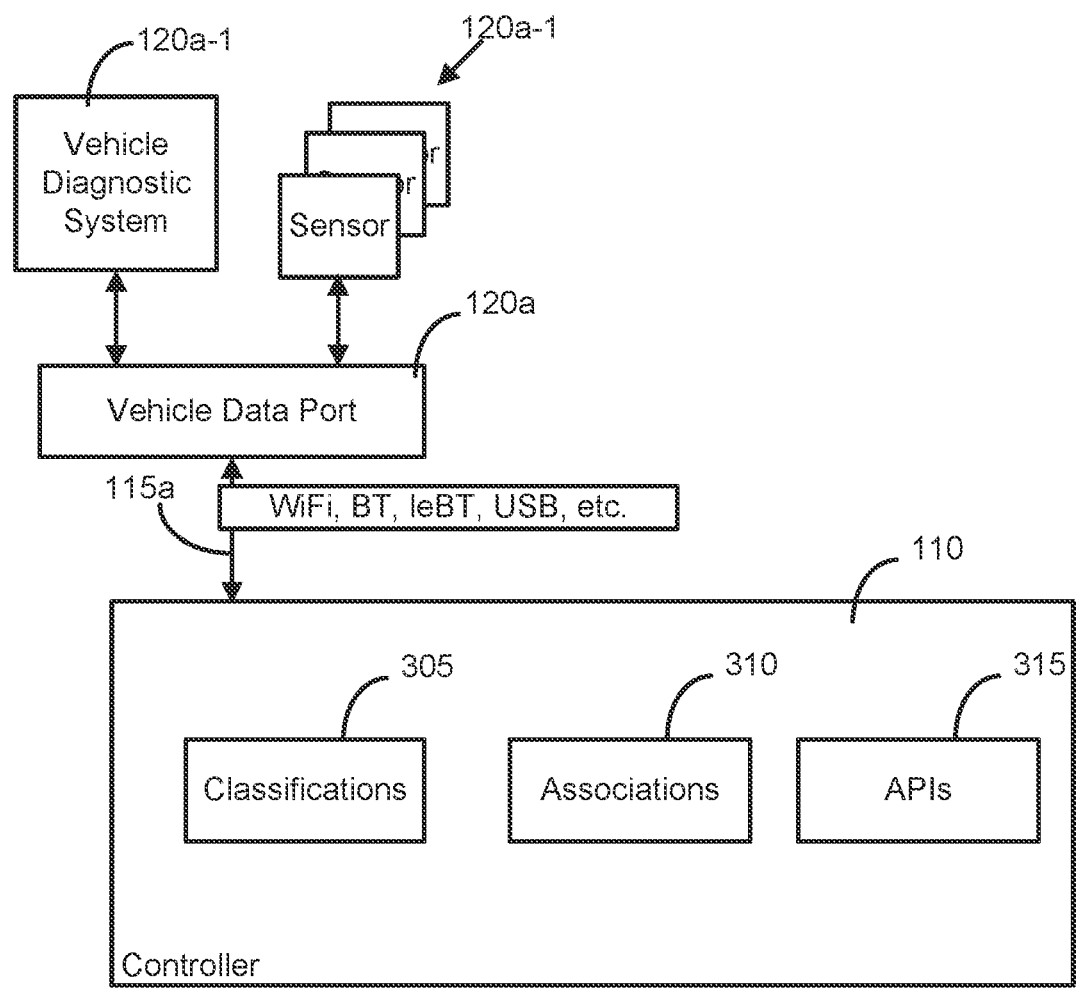
FIG. 3 is a block diagram illustrating components of the vehicle navigator system of FIG. 1, according to some embodiments.

FIG. 3 is a block diagram illustrating components of vehicle navigator system 100, according to some embodiments. Controller 110 may include any or any combination of an Application Specific Integrated Circuit (ASIC), an electronic circuit, a programmable combinatorial circuit (e.g., FPGA), a processor (shared, dedicated, or group) or memory (shared, dedicated, or group) that may execute one or more software or firmware programs, or other suitable components that provide the described functionality. In some embodiments, controller 100 may employ a software development kit (SDK) that may include and/or provide any or all of classifications 305 that may classify operation styles and/or route types, one or more associations 310 between route types and operation styles from which associations route may be provided, and/or APIs 315 (e.g., public APIs) that may be used to develop applications for automobile navigation systems, phones/connected devices, etc.

In embodiments, one or more of vehicle sensors 120a-2 to determine, sense, and/or provide to controller 110 data regarding one or more other vehicle characteristics may be and/or include Internet of Things ("IoT") devices. IoT devices may be objects or "things", each of which may be embedded with hardware or software that may enable connectivity to a network, typically to provide information to a system, such as controller 110. Because the IoT devices are enabled to communicate over a network, the IoT devices may exchange event-based data with service providers or systems in order to enhance or complement the services that may be provided. These IoT devices are typically able to transmit data autonomously or with little to no user intervention. In embodiments, connection 115*a* may accommodate vehicle sensors 120*a*-2 as IoT devices and may include IoT-compatible connectivity, which may include any or all of WiFi. BlueTooth, low-energy BlueTooth, USB, etc.

Figure 4:
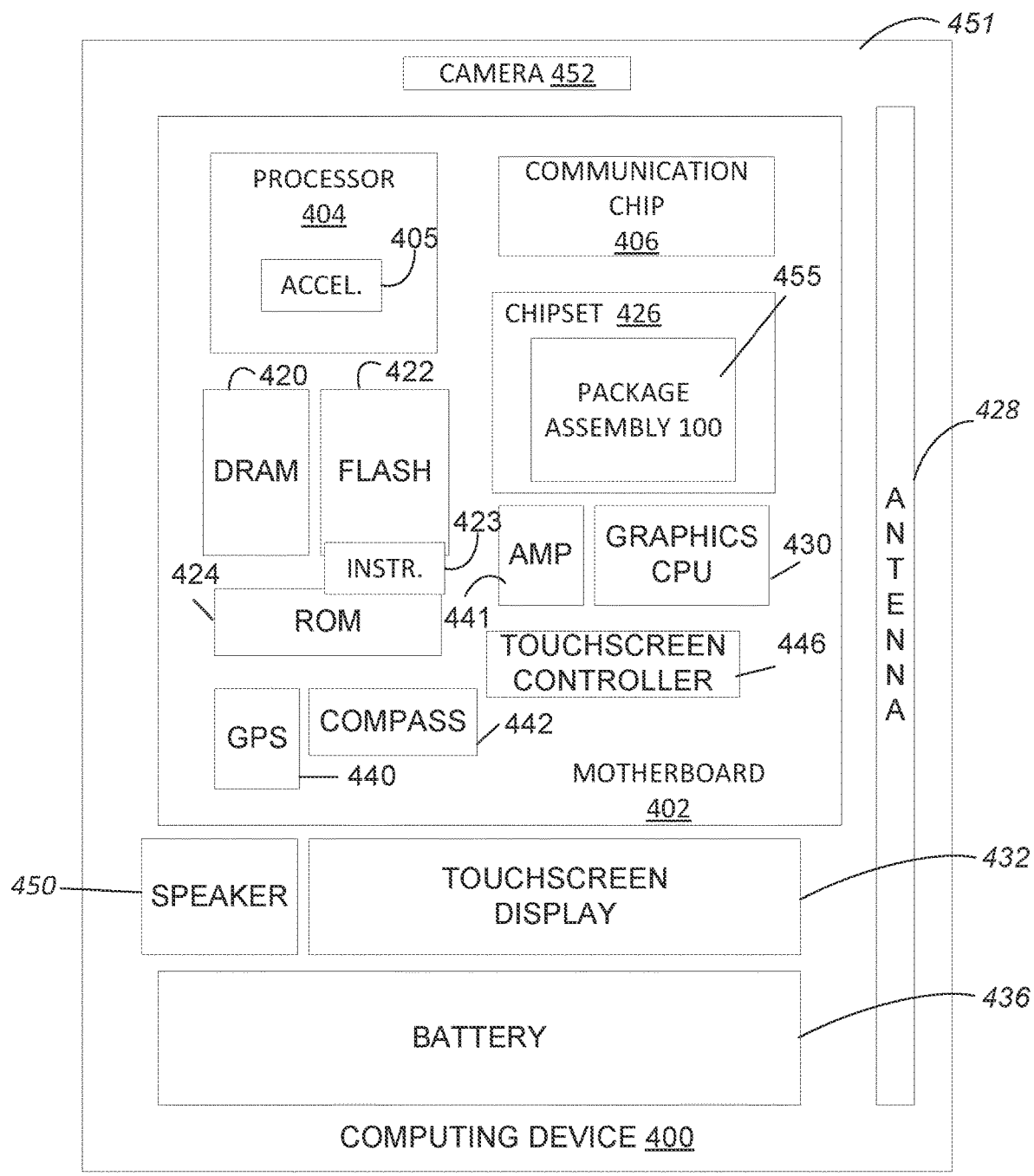
FIG. 4 schematically illustrates an example computing device in accordance with one embodiment.

Embodiments of the present disclosure may be implemented into a system using any suitable hardware and/or software to configure as desired. FIG. 4 schematically illustrates a computing device 400 in accordance with one embodiment. The computing device 400 may house a board such as motherboard 402 (i.e. housing 451). The motherboard 402 may include a number of components, including but not limited to a processor 404 and at least one communication chip 406. The processor 404 may include one or more processor cores physically and electrically coupled to the motherboard 402. In some implementations, the at least one communication chip 406 may also be physically and electrically coupled to the motherboard 402. In further implementations, the communication chip 406 may be part of the processor 404. In embodiments, processor 404 may include hardware accelerator 405 (e.g., FPGA).

Depending on its applications, computing device 400 may include other components that may or may not be physically and electrically coupled to the motherboard 402. These other components may include, but are not limited to, volatile memory (e.g., DRAM) 420, non-volatile memory (e.g., ROM) 424, and flash memory 422. In embodiments, flash 422 and/or ROM 424 may include executable programming instructions 423 configured to implement earlier described vehicle navigation system 100. In embodiments, some aspects of navigation system 100, e.g., the determination of operation styles, or the matching of operation style with route type, may be implemented with hardware accelerator 405 instead.

In embodiments, computing device 400 may further include a graphics processor 430, a digital signal processor (not shown), a crypto processor (not shown), a chipset 426, an antenna 428, a display (not shown), a touchscreen display 432, a touchscreen controller 446, a battery 436, an audio codec (not shown), a video codec (not shown), a power amplifier 441, a global positioning system (GPS) device 440, a compass 442, an accelerometer (not shown), a gyroscope (not shown), a speaker 450, a camera 452, and a mass storage device (such as hard disk drive, compact disk (CD), digital versatile disk (DVD), and so forth) (not shown). Further components, not shown in FIG. 4, may include a microphone, a filter, an oscillator, a pressure sensor, or an RFID chip.

The communication chip 406 may enable wireless communications for the transfer of data to and from the computing device 400. The term "wireless" and its derivatives may be used to describe circuits, devices, systems, processes, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. The communication chip 406 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 406 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 406 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 406 may operate in accordance with other wireless protocols in other embodiments.

The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX. LTE, Ev-DO, and others.

The processor 404 of the computing device 400 may include a die in a package assembly. The term "processor" may refer to any device or portion of a device that processes electronic data from registers and/or memory to transform that electronic data into other electronic data that may be stored in registers and/or memory.

Some non-limiting Examples are provided below.

Example 1 may include an on-board vehicle navigator system, which may include one or more vehicle sensors disposed in a vehicle to sense one or more characteristics of operation of an operator of the vehicle; a controller disposed in the vehicle and coupled with the one or more vehicle sensors; and a location system coupled with the controller, wherein the controller is to: receive data from the one or more sensors as to the one or more characteristics of operation of an operator of the vehicle; receive vehicle location information from the location system to indicate a location of the vehicle; obtain a destination location; and provide a route from the vehicle location to the destination location for the operator, according to at least one of a plurality of operation styles by which the operator operates the vehicle, wherein the at least one of the plurality of operation styles by which the operator operates the vehicle is determined based at least in part on the data received from the one or more sensors.

Example 2 may include the system of example 1, wherein the controller may determine the at least one of the plurality of operation styles based at least in part on the data received from the one or more sensors Example 3 may include the system of example 1 or 2, wherein the controller may determine the at least one of the plurality of operation styles without an explicit input by the operator to the system of the at least one of the plurality of operation styles.

Example 4 may include the system of example 1 or 2, wherein the controller may further associate the plurality of operation styles with a plurality of route types.

Example 5 may include the system of example 4, wherein the plurality of route types may include one or more of a fuel-efficient route and a safe route.

Example 6 may include the system of example 1 or 2 and may further include a communication connection to communicate with a mobile communication device.

Example 7 may include the system of example 6 wherein the controller may further provide over the communication connection the at least one of the plurality of operation styles by which an operator operates the vehicle to be transmitted by the mobile communication device to be stored remotely.

Example 8 may include the system of example 6 wherein the controller may further provide over the communication connection the route from the vehicle location to the destination location according to the at least one of the plurality of operation styles by which the operator operates the vehicle to be transmitted by the mobile communication device to be stored remotely.

Example 9 may include the system of example 1 or 2 wherein the vehicle may include a motor vehicle.

Example 10 may include the system of example 1 or 2 wherein one or more of the vehicle sensors may include Internet-of-Things (IoT) sensors.

Example 11 may include an on-board vehicle navigator system, which may include one or more vehicle sensors disposed in a vehicle to sense one or more characteristics of operation of an operator of the vehicle; a controller disposed in the vehicle, and coupled with the one or more vehicle sensors; and a location system coupled with the controller, wherein the controller is to: receive data from the one or more sensors as to one or more characteristics of operation of an operator of the vehicle; receive vehicle location information from the location system to indicate a location of the vehicle; obtain a destination location: determine from the data a route according to at least one of a plurality of route types between the vehicle location and the destination location; and provide a route for the operator from the vehicle location to the destination location according to the at least one of the plurality of route types; wherein the route according to at least one of the plurality of route types between the vehicle location and the destination location is determined based at least in part on the data received from the one or more sensors.

Example 12 may include the system of example 11, wherein the controller may determine the route without an explicit input by the operator to the system of the at least one of the plurality of route types.

Example 13 may include the system of example 12, wherein the plurality of route types may include one or more of a fuel-efficient route and a safe route.

Example 14 may include the system of example any of examples 11-13 wherein the system may further include a communication connection to communicate with a mobile communication device.

Example 15 may include the system of example 14 wherein the controller may further provide over the communication connection the route according to at least one of the plurality of route types to be transmitted by the mobile communication system to be stored remotely.

Example 16 may include the system of example 14 wherein the controller may further determine from the data at least one of a plurality of operation styles by which an operator operates the vehicle.

Example 17 may include the system of example 16 wherein the controller may further provide over the connection at least one of a plurality of operation styles by which an operator operates the vehicle to be transmitted by the mobile communication device to be stored remotely.

Example 18 may include the system of example of any of examples 11-13, wherein one or more of the vehicle sensors may include Internet-of-Things (IoT) sensors.

Example 19 may include at least one computer-readable storage medium having a plurality of instructions, in response to execution by a processor of an on-board vehicle navigator system, may cause the on-board vehicle navigator system to: receive data from one or more sensors as to one or more characteristics of operation of an operator of a motor vehicle; receive motor vehicle location information from a location system to indicate a location of the motor vehicle; obtain an input of a destination location; and provide a route for the operator from the motor vehicle location to the destination location according to the at least one of the plurality of operation styles by which the operator operates the motor vehicle, wherein the at least one of the plurality of operation styles by which the operator operates the vehicle is determined based at least in part on the data received from the one or more sensors.

Example 20 may include the at least one computer-readable storage medium of example 19, wherein the at least one computer-readable storage medium may further include instructions to determine the at least one of the plurality of operation styles based at least in part on the data received from the one or more sensors.

Example 21 may include the at least one computer-readable storage medium of example claim 19 or 20, wherein the instructions to determine from the data at least one of a plurality of operation styles by which an operator operates the motor vehicle may include instructions to determine the at least one of the plurality of operation styles without an explicit input by the operator to the system of the at least one of the plurality of operation styles.

Example 22 may include the at least one computer-readable storage medium of example 19 or 20, wherein the at least one computer-readable storage medium may further include instructions to associate the plurality of operation styles with a plurality of route types.

Example 23 may include the at least one computer-readable storage medium of example 22, wherein the plurality of route types may include one or more of a fuel-efficient route and a safe route.

Example 24 may include the at least one computer-readable storage medium of example 19 or 20 wherein the on-board vehicle navigator system may include a communication connection to communicate with a mobile communication device.

Example 25 may include the at least one computer-readable storage medium of example 24 wherein the at least one computer-readable storage medium may further include instructions to provide over the communication connection the at least one of the plurality of operation styles by which an operator operates the motor vehicle to be transmitted by the mobile communication device to be stored remotely.

Example 26 may include the at least one computer-readable storage medium of example 24 wherein the at least one computer-readable storage medium may further include instructions to provide over the communication connection the route from the motor vehicle location to the destination location according to the at least one of the plurality of operation styles by which the operator operates the motor vehicle to be transmitted by the mobile communication device to be stored remotely.

Example 27 may include a method, which may include: receiving data from one or more sensors as to one or more characteristics of operation of an operator of a motor vehicle; receiving motor vehicle location information from a location system to indicate a location of the motor vehicle; obtaining an input of a destination location; and providing a route for the operator from the motor vehicle location to the destination location according to the at least one of the plurality of operation styles by which the operator operates the motor vehicle and at least one of a plurality of route types associated with the operation styles, wherein the at least one of the plurality of operation styles by which the operator operates the vehicle is determined based at least in part on the data received from the one or more sensors.

Example 28 may include the method of example 27, wherein the method may further comprise determining the at least one of the plurality of operation styles based at least in part on the data received from the one or more sensors.

Example 29 may include the method of example 27 or 28, wherein the method may further comprise determining the at least one of the plurality of operation styles without an explicit input by the operator of the at least one of the plurality of route types.

Example 30 may include the method of example 27 or 28, wherein the plurality of route types may include one or more of a fuel-efficient route and a safe route.

Example 31 may include the method of example 27 or 28, wherein the method may further include communicating with a mobile communication device.

Example 32 may include the method of example 31 wherein the method further may comprise providing the at least one of the plurality of operation styles by which an operator operates the motor vehicle to the mobile communication device to be transmitted by the mobile communication device to be stored remotely.

Example 33 may include the method of example 31 wherein the method may further comprise providing to the mobile communication device the route from the motor vehicle location to the destination location according to the at least one of the plurality of operation styles by which the operator operates the motor vehicle to be transmitted by the mobile communication device to be stored remotely.

Example 34 may include a system, which may comprise: means to receive data from one or more sensors as to one or more characteristics of operation of an operator of a motor vehicle; means to receive motor vehicle location information from a location system to indicate a location of the motor vehicle; means to obtain a destination location; and means to provide a route for the operator from the motor vehicle location to the destination location according to the at least one of the plurality of operation styles by which the operator operates the motor vehicle or at least one of a plurality of route types associated with the operation styles, wherein the at least one of the plurality of operation styles by which the operator operates the vehicle is determined based at least in part on the data received from the one or more sensors.

Example 35 may include the system of example 34, wherein the system may further comprise means to determine the at least one of the plurality of operation styles based at least in part on the data received from the one or more sensors.

Example 36 may include the system of example 34 or 35, wherein the system may further comprise means to determine the at least one of the plurality of operation styles without an explicit input by the operator of the at least one of the plurality of route types.

Example 37 may include the system of example 34 or 35, wherein the plurality of route types includes one or more of a fuel-efficient route and a safe route.

Example 38 may include the system of example 34 or 35, wherein the system may further comprise means to communicate with a mobile communication device.

Example 39 may include the system of example 38 wherein the system may further comprise means to provide the at least one of the plurality of operation styles by which an operator operates the motor vehicle to the mobile communication device to be transmitted by the mobile communication device to be stored remotely.

Example 40 may include the system of example 38 wherein the system may further comprise means to provide to the mobile communication device the route from the motor vehicle location to the destination location according to the at least one of the plurality of operation styles by which the operator operates the motor vehicle to be transmitted by the mobile communication device to be stored remotely.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed:

1. A vehicle navigation system for a vehicle, the vehicle navigation system comprising:
    a memory including instructions; and
    circuitry that, when in operation, is configured by the instructions to:
    obtain a destination location for a vehicle that includes the vehicle navigation system;
    determine a plurality of routes to the destination location, the plurality of routes including respective environmental factors;
    determine a driving style used to operate the vehicle;
    determine energy use of the vehicle based on the driving style and the respective environmental factors; and
    select a route from the plurality of routes based on the energy use.

2. The vehicle navigation system of claim 1, wherein, to determine the driving style, the circuitry is configured to calculate a speed of the vehicle.

3. The vehicle navigation system of claim 1, wherein the respective environmental factors include one or more of:
    road smoothness;
    speed limits; or
    traffic.

4. The vehicle navigation system of claim 1, wherein the instructions configure the circuitry to provide the route to an operator of the vehicle.

5. The vehicle navigation system of claim 4, wherein, to provide the route to the operator of the vehicle, the circuitry is configured to send the route to a display of the vehicle navigation system.

6. The vehicle navigation system of claim 4, wherein, to provide the route to the operator of the vehicle, the circuitry is configured to provide the route to a mobile wireless device of the operator.

7. The vehicle navigation system of claim 4, wherein the instructions configure the circuitry to indicate, to the operator of the vehicle, a break on the route.

8. At least one machine-readable medium including instructions, the instructions, when executed by hardware logic of a vehicle navigation system, cause the hardware logic to perform operations comprising:
- obtaining a destination location for a vehicle that includes the vehicle navigation system;
- determining a plurality of routes to the destination location, the plurality of routes including respective environmental factors;
- determining a driving style used to operate the vehicle;
- determining energy use of the vehicle based on the driving style and the respective environmental factors; and
- selecting a route from the plurality of routes based on the energy use.

9. The at least one machine-readable medium of claim 8, wherein determining the driving style includes calculating a speed of the vehicle.

10. The at least one machine-readable medium of claim 8, wherein the respective environmental factors include one or more of:
- road smoothness;
- speed limits; or
- traffic.

11. The at least one machine-readable medium of claim 8, wherein the instructions, when executed by the hardware logic, further cause the hardware logic to provide the route to an operator of the vehicle.

12. The at least one machine-readable medium of claim 11, wherein providing the route to the operator of the vehicle includes sending the route to a display of the vehicle navigation system.

13. The at least one machine-readable medium of claim 11, wherein providing the route to the operator of the vehicle includes providing the route to a mobile wireless device of the operator.

14. The at least one machine-readable medium of claim 11, wherein the instructions, when executed by the hardware logic, further cause the hardware logic to indicate, to the operator, a break on the route.

15. A vehicle comprising:
- a touch screen display; and
- a vehicle navigation system configured to:
- obtain a destination location for the vehicle from input entered into the touch screen display;
- determine a plurality of routes to the destination location, the plurality of routes including respective environmental factors;
- determine a driving style used to operate the vehicle;
- determine energy use of the vehicle based on the driving style and the respective environmental factors; and
- select a route from the plurality of routes based on the energy use.

16. The vehicle of claim 15, wherein, to determine the driving style, the vehicle navigation system is configured to measure a speed of the vehicle.

17. The vehicle of claim 13, wherein the respective environmental factors include one or more of:
- road smoothness;
- speed limits; or
- traffic.

18. The vehicle of claim 15, wherein the vehicle navigation system is configured to provide the route to an operator of the vehicle.

19. The vehicle of claim 18, wherein the route is provided to the operator of the vehicle on the touch screen display.

20. The vehicle of claim 18, wherein the route is provided to the operator of the vehicle by a mobile wireless device of the operator.

* * * * *